March 29, 1949. E. PATTERSON 2,465,473
LINE TIGHTENER
Filed July 31, 1946
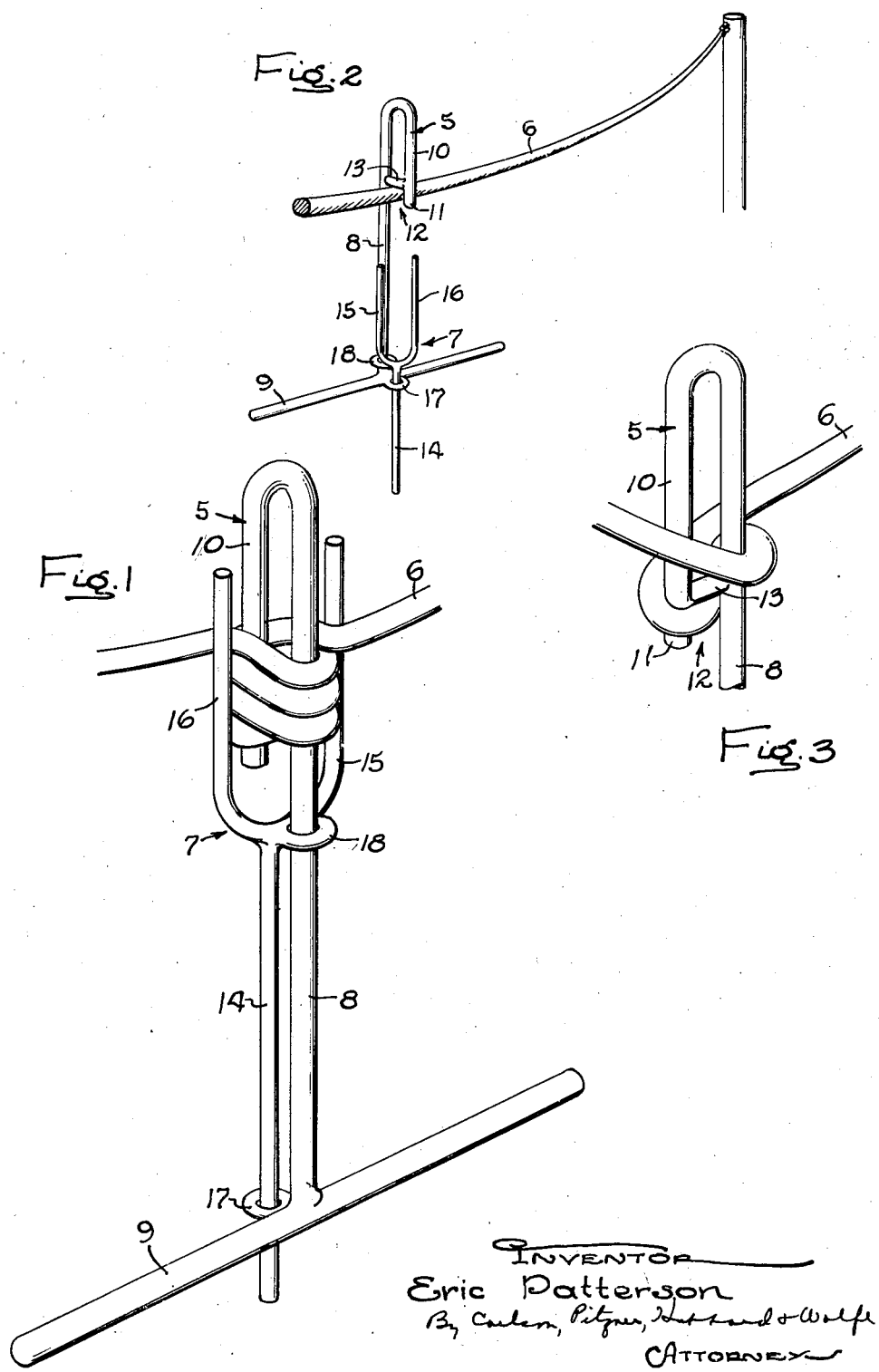
INVENTOR
Eric Patterson Patented Mar. 29, 1949

2,465,473

UNITED STATES PATENT OFFICE 2,465,473

LINE TIGHTENER

Eric Patterson, Rockford, Ill.

Application July 31, 1946, Serial No. 687,348

1 Claim. (Cl. 24—71.2)

The invention relates to a device for tightening a sagging line, such as a clothes line.

An object of the invention is to provide a tightener of the above character which is easy to operate, which is simple and sturdy in construction, and which is relatively inexpensive to manufacture.

A further object is to provide an improved means for guiding the member by which the reeled up line is locked against unwinding.

The invention also resides in the novel construction and location of the hook for catching the line and supporting the tightener thereon.

Other objects and advantages of the invention will become apparent from the following detailed description taken in connection with the accompanying drawings, in which Figure 1 is a perspective view of the line tightener embodying the present invention.

Fig. 2 is a perspective view with the member preventing unwinding of the reel in a retracted position.

Fig. 3 is a fragmentary view similar to Fig. 1.

Referring now to the drawings, the improved line tightener comprises generally a reel 5 around which the slack portion of a line 6 may be wound combined with a fork 7, slidable axially of the reel to straddle the wound-up line and hold the same against unwinding. The reel and the fork are both supported by an elongated straight rod 8, preferably of circular cross section, having a cross member 9 attached, as by butt welding, to the end opposite the reel so as to form a turning handle.

The reel comprises a flat-sided enlargement disposed on one side of the rod at the end opposite the handle and formed, in this instance, by bending a part 10 of the rod reversely into parallelism with the rod proper but spaced laterally therefrom. Also, in the present instance, the end portion 11, of the part 10, coacts with the rod proper and forms a recess which opens toward the handle 9 so that the rod and one end portion of the reel form a hook 12 for receiving the line to be wound up on the reel. The hook is completed herein by extending a cross piece 13 between the rod 8 and the hook end 11, the parts being connected, as by butt welds at the ends of the cross piece.

The fork 7, which may be made of wire of rounded cross section, comprises a straight shank 14 having a yoke on one end with two tines 15 and 16 approximately parallel and spread apart sufficiently to straddle the reel when a layer of the line is wound thereon. The length of the tines is substantially the same as that of the reel so that they will engage the full length of the line wound on the reel. With the fork in a retracted position (Fig. 2), the shank projects beyond the turning handle and forms an auxiliary handle which may be grasped conveniently to support the tightener with the reel in a vertical position when first applying it to a line to be tightened.

Suitable means is provided to guide the fork as it moves back and forth from a retracted position (Fig. 1) to a reel-locking position (Fig. 2). In this instance, the shank 14 of the fork slides in an eye 17 which projects outwardly from the handle at the junction with the rod and on the reel side of the latter. Similarly, an eye 18 projecting laterally from the mid-point of the yoke slides axially along the rod 8 between the handle and the reel. The eyes are of such length as to space the fork above midway between the rod 8 and the bent back part 10 while holding the fork in a plane perpendicular to the flat sided reel. Travel of the fork along the rod 8 away from the hook is limited by the engagement of the eye 18 with the handle 9. With the tightener in this limit position, the tines of the fork are spaced from the hook end 11 a distance somewhat greater than the line thickness.

Preparatory to using the tightener, the fork is retracted whereby the tine ends are disposed below the hook to render the latter accessible as shown in Fig. 2. With the shank 14 grasped in one hand so that the rod and the reel project upwardly, the reel is hooked over the downwardly sagging line 6 which is thus caught in the downwardly hook 12 so that the tightener becomes suspended from the line and the latter placed under some tension thereby locating the adjacent positions of the line automatically in the correct positions for winding on the reel. By turning the handle 9, the line will first be looped around the hook end 11 (Fig. 3) and then will be wrapped around the reel in successive convolutions which are maintained adjacent each other and caused to progress upwardly along the reel simply by pulling downwardly on the handles sufficiently to maintain the line taut.

Winding of the line on the reel is continued until the sag has been removed after which the fork 7 is slid upwardly so that the tines straddle the reel and compress the wound-up line against the flat sides of the reel. Since the tines slide in a plane disposed between the sides 8 and 10 of the reel, the line may be bent into the space between the reel parts thereby facilitating this compressing action. The line is thus locked against unwinding and the fork becomes held frictionally in locked position.

I claim as my invention:

In a line tightener, an elongated substantially straight rod having one end portion bent reversely into parallelism with the rod and cooperating therewith to form a U-shaped flat sided reel with the U opening along the rod toward the other end thereof, a handle rigid with the latter end of said rod and disposed substantially adjacent the latter, a member rigid with and extending across the legs of said U at a point spaced from the open end of the U and cooperating with the reversely bent portion and said rod to form a hook, a Y-shaped fork having a shank slidable bodily along said rod beyond the open end of said U from a retracted position in which the fork tines are spaced from said U to expose said hook to a locking position in which the tines straddle the U and are disposed in a plane substantially perpendicular thereto, and means on said rod guiding said fork in its bodily sliding motion, said U being adapted, when said fork is retracted, to hook over a line to be tightened and enable the latter to be drawn taut and located relative to said reel preparatory to winding the line onto the latter by turning said handle.

ERIC PATTERSON.

REFERENCES CITED

The following references are of record in the file of this patent:

UNITED STATES PATENTS

| Number | Name | Date |
|---|---|---|
| 328,824 | Squires | Oct. 20, 1885 |
| 449,085 | Pettay | Mar. 24, 1891 |
| 530,035 | Frock | Nov. 27, 1894 |
| 1,261,505 | Fitzsimmons | Apr. 2, 1918 |